US007697029B2

(12) United States Patent  
Ozaki

(10) Patent No.: US 7,697,029 B2  
(45) Date of Patent: Apr. 13, 2010

(54) IMAGE DISPLAY APPARATUS AND METHOD

(75) Inventor: Osamu Ozaki, Tagata-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 459 days.

(21) Appl. No.: 11/878,722

(22) Filed: Jul. 26, 2007

(65) Prior Publication Data

US 2008/0024607 A1     Jan. 31, 2008

(30) Foreign Application Priority Data

Jul. 26, 2006    (JP)   ............................. 2006-203666

(51) Int. Cl.  
*H04N 7/18*     (2006.01)

(52) U.S. Cl. .................. 348/148; 348/118; 348/135; 348/149

(58) Field of Classification Search .................. 348/118, 348/135, 148, 149  
See application file for complete search history.

(56) References Cited

U.S. PATENT DOCUMENTS 6,744,380 B2 * 6/2004 Imanishi et al. ............. 340/937  
2001/0024514 A1 * 9/2001 Matsunaga .................. 382/106

FOREIGN PATENT DOCUMENTS

| JP | A-4-339282 | 11/1992 |
|---|---|---|
| JP | A-10-211849 | 8/1998 |
| JP | A-2001-187553 | 7/2001 |
| JP | A-2001-311619 | 11/2001 |
| JP | A-2002-166802 | 6/2002 |
| JP | B2-3300334 | 7/2002 |
| JP | A-2003-091720 | 3/2003 |
| JP | A-2003-274394 | 9/2003 |
| JP | A-6-194164 | 7/2004 |
| WO | WO 00/64175 A1 | 10/2000 |

* cited by examiner

*Primary Examiner*—Huy T Nguyen  
(74) *Attorney, Agent, or Firm*—Oliff & Berridge, PLC

(57) ABSTRACT

An image display apparatus includes a camera, a laser radar, a depression angle correction calculation device, a three-dimensional object detection device, and a viewpoint conversion device, which are installed in a vehicle. The laser radar detects changes in the condition of a road surface with respect to the camera. The depression angle correction calculation device adds a correction angle to a depression angle of the camera. The viewpoint conversion device reduces the correction angle if the change in road surface condition detected by the laser radar is due to a three-dimensional object detected by the three-dimensional object detection device.

19 Claims, 10 Drawing Sheets

FIG. 4
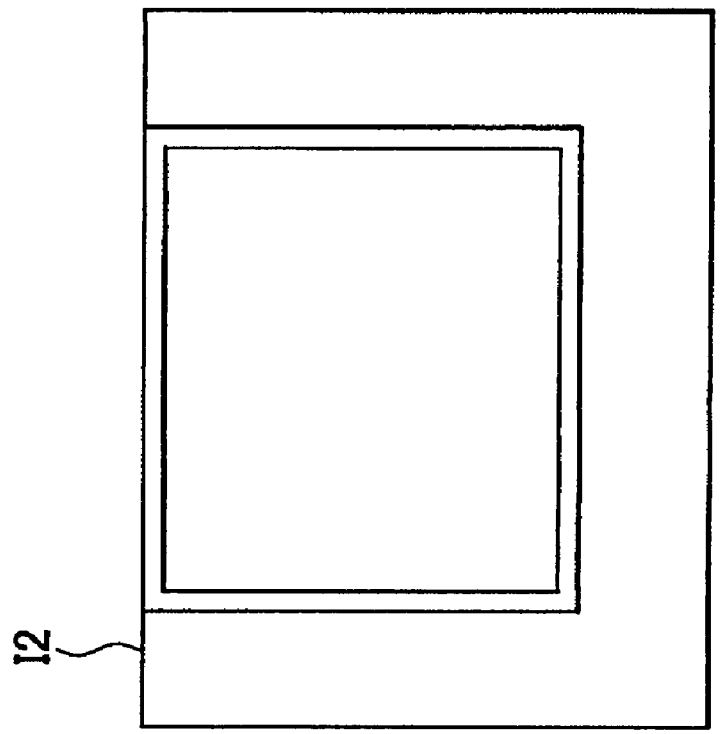
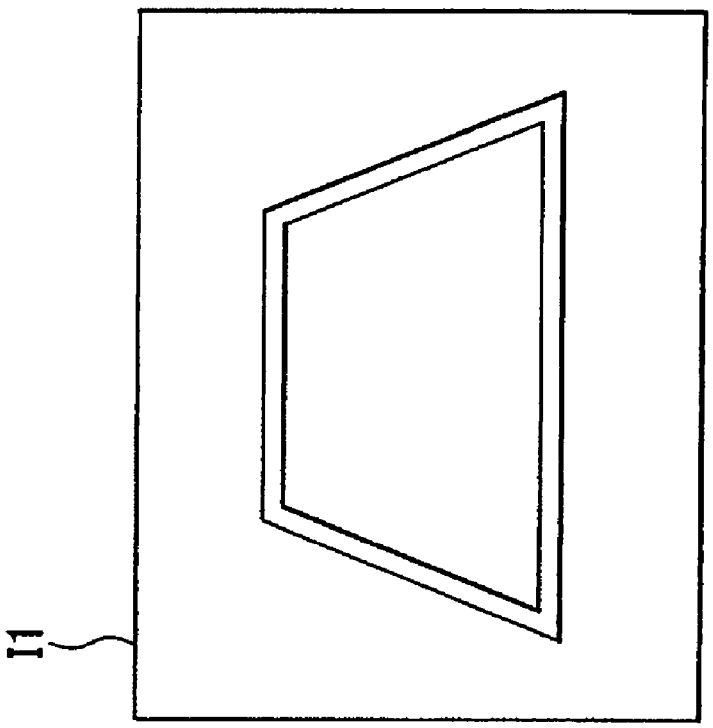

IMAGE DISPLAY APPARATUS AND METHOD

INCORPORATION BY REFERENCE

The disclosure of Japanese Patent Application No. 2006-203666 filed on Jul. 26, 2006 including the specification, drawings and abstract is incorporated herein by reference in its entirety.

BACKGROUND OF THE INVENTION

1. Field of the Invention

The present invention relates to an image display apparatus and method, and in particular, to an image display apparatus and method for converting a viewpoint of an original image of the driving environment obtained with an imaging device to display a bird's eye view image.

2. Description of the Related Art

There is conventionally known a parking assisting device mounted on a vehicle to allow an operator to recognize a distance to an obstruction and so forth Such a device obtains an original image by imaging the driving environment with a camera mounted on the vehicle, and converts the viewpoint of the obtained image based on a depression angle of the camera, to generate and display a bird's eye view image to the operator. When the vehicle is operated on an actual road, however, the angle of the camera relative to the road surface changes according to various factors such as bumps and dips and inclination of the road surface, cargoes carried by the vehicle, and deterioration of the vehicle over years, which makes it impossible to obtain a correct bird's eye view image by viewpoint conversion using the initially set depression angle of the camera. Such changes in angle of the camera relative to the road surface may result in bird's eye view images at a different scale or with unnatural distortion.

In order to solve this problem, Japanese Patent Application Publication No. 2003-274394 (JP-A-2003-274394) discloses a related art that uses a laser emission device for emitting a directional laser beam and a height sensor to measure an angle of a camera relative to a road surface, and that adds a correction angle to a depression angle of the camera based on the measurement results to generate a bird's eye view image in accordance with changes in angle of the camera relative to the road surface.

The above related art, however, is built on the premise that there is no three-dimensional object present on the road surface. Therefore, a three-dimensional object on the road surface such as curbs and car stoppers, if any, is regarded as a part of the road surface in calculating a correction angle for the depression angle of the camera, even though such a three-dimensional object does not in fact affect the angle of the camera relative to the road surface. Thus, an unexpected correction angle is obtained, which consequently results in display of a bird's eye view image that is significantly uncomfortable to the operator.

SUMMARY OF THE INVENTION

The present invention provides an image display apparatus and method that can display a bird's eye view image that is corrected according to changes in road surface conditions and that is less affected by a three-dimensional object on the road surface.

An aspect of the present invention provides an image display apparatus that converts the viewpoint of an original image of the driving environment obtained with an imaging device based on a depression angle of the imaging device to display a bird's eye view image, including: a road surface condition detection device for detecting a change in condition of a road surface with respect to the imaging device; a depression angle correction calculation device that adds a correction angle to the depression angle of the imaging device in response to the change in condition of the road surface detected by the road surface condition detection device; a depression angle correction modification device for reducing the correction angle of the depression angle correction calculation device; and a three-dimensional object detection device for detecting a three-dimensional object present on the road surface, in which the depression angle correction modification device reduces the correction angle of the depression angle correction calculation device if the change in condition of the road surface detected by the road surface condition detection device is due to the three-dimensional object detected by the three-dimensional object detection device.

With this configuration, the road surface condition detection device detects a change in condition of a road surface with respect to the imaging device, the depression angle correction calculation device adds a correction angle to the depression angle of the imaging device, and the depression angle correction modification device reduces the correction angle of the depression angle correction calculation device if the change in condition of the road surface detected by the road surface condition detection device is due to a three-dimensional object detected by the three-dimensional object detection device. Thus, it is possible to display a bird's eye view image that is corrected according to changes in road surface conditions and that is less affected by a three-dimensional object on the road surface.

The term "three-dimensional object" as used in the aspect of the present invention refers to foreign objects present on the road surface, and bumps and dips on the road surface, that do not significantly change the angle between the imaging device and the road surface.

In the above aspect, the road surface condition detection device may measure the distance between the imaging device and the road surface, and the depression angle correction modification device may reduce the correction angle if the distance between the imaging device and the road surface detected by the road surface condition detection device is equal to the distance between the three-dimensional object detected by the three-dimensional object detection device and the imaging device. With this configuration, erroneous correction due to a three-dimensional object is less likely to occur.

In this case, the road surface condition detection device may include a laser radar for measuring the distance between the imaging device and the road surface. The inclusion of a laser radar in the road surface condition detection device allows more accurate measurement of the distance between the imaging device and the road surface.

Another aspect of the present invention provides an image display method for converting a viewpoint of an original image of the driving environment obtained with an imaging device based on a depression angle of the imaging device to display a bird's eye view image, including: detecting a change in condition of a road surface with respect to the imaging device; detecting a three-dimensional object present on the road surface; adding a correction angle to the depression angle of the imaging device in response to the detected change in condition of the road surface; and reducing the correction angle if the detected change in condition of the road surface is due to the detected three-dimensional object.

With the image display apparatus and method in accordance with the aspects of the present invention, it is possible to display a bird's eye view image that is corrected according to changes in road surface conditions and that is less affected by a three-dimensional object on the road surface.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 4 is a diagram showing images before and after the perspective transformation in accordance with the embodiment;

DETAILED DESCRIPTION OF EMBODIMENTS

An image display apparatus in accordance with an embodiment of the present invention will be described below with reference to the accompanying drawings.

Figure 1:
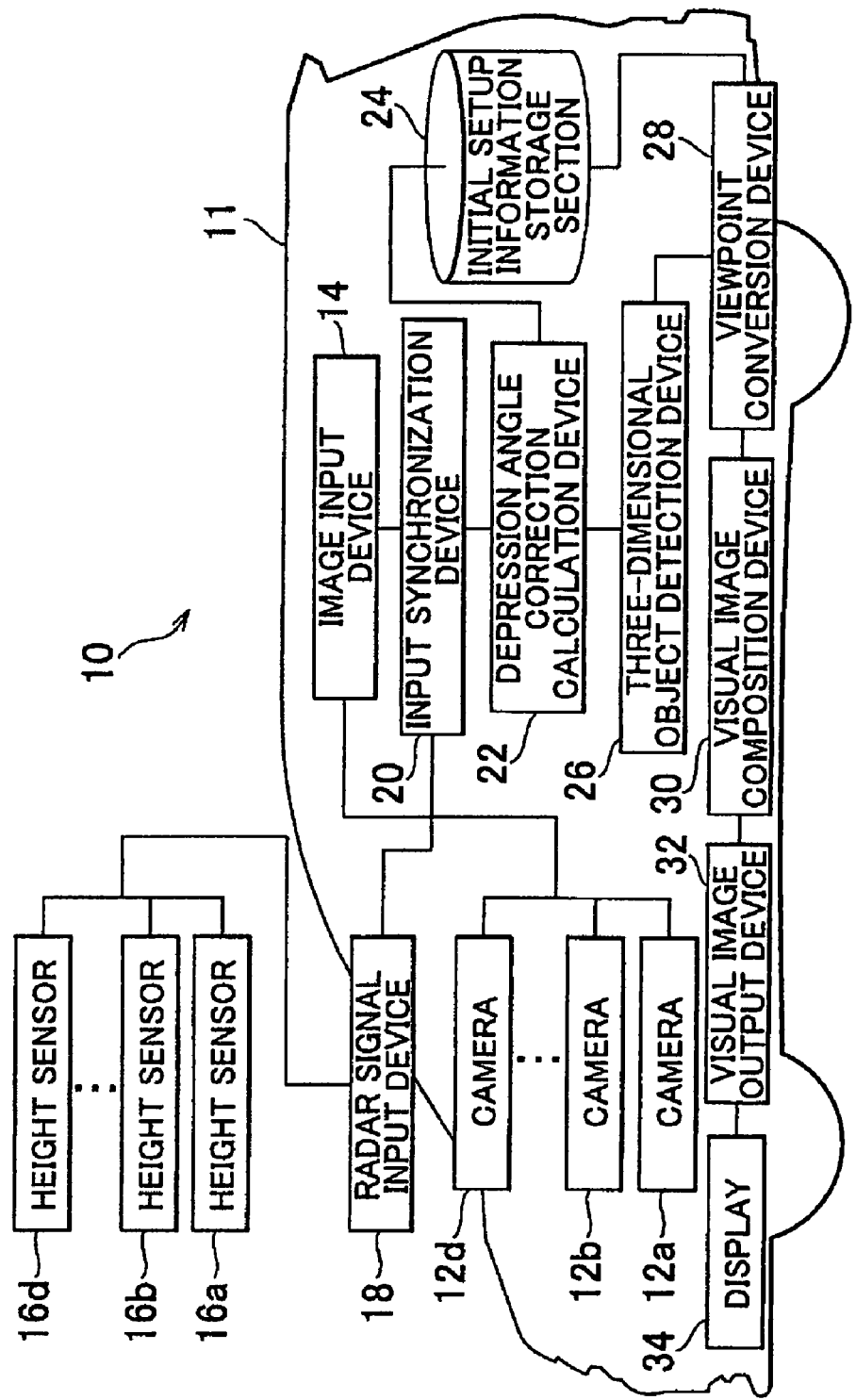
FIG. 1 is a block diagram showing the configuration of an image display apparatus in accordance with an embodiment.

FIG. 1 is a block diagram showing the configuration of the image display apparatus in accordance with the embodiment As shown in FIG. 1, an image display apparatus 10 of this embodiment includes cameras (imaging devices) 12a to 12d, an image input device 14, laser radars (road surface condition detection devices) 16a to 16d, a radar signal input device 18, an input synchronization device 20, a depression correction angle calculation device 22, an initial setup information storage section 24, a three-dimensional object detection device 26, a viewpoint conversion device (depression angle correction modification device) 28, a visual image composition device 30, a visual image output device 32, and a display 34, which are installed in a vehicle body 11.

Figure 2:
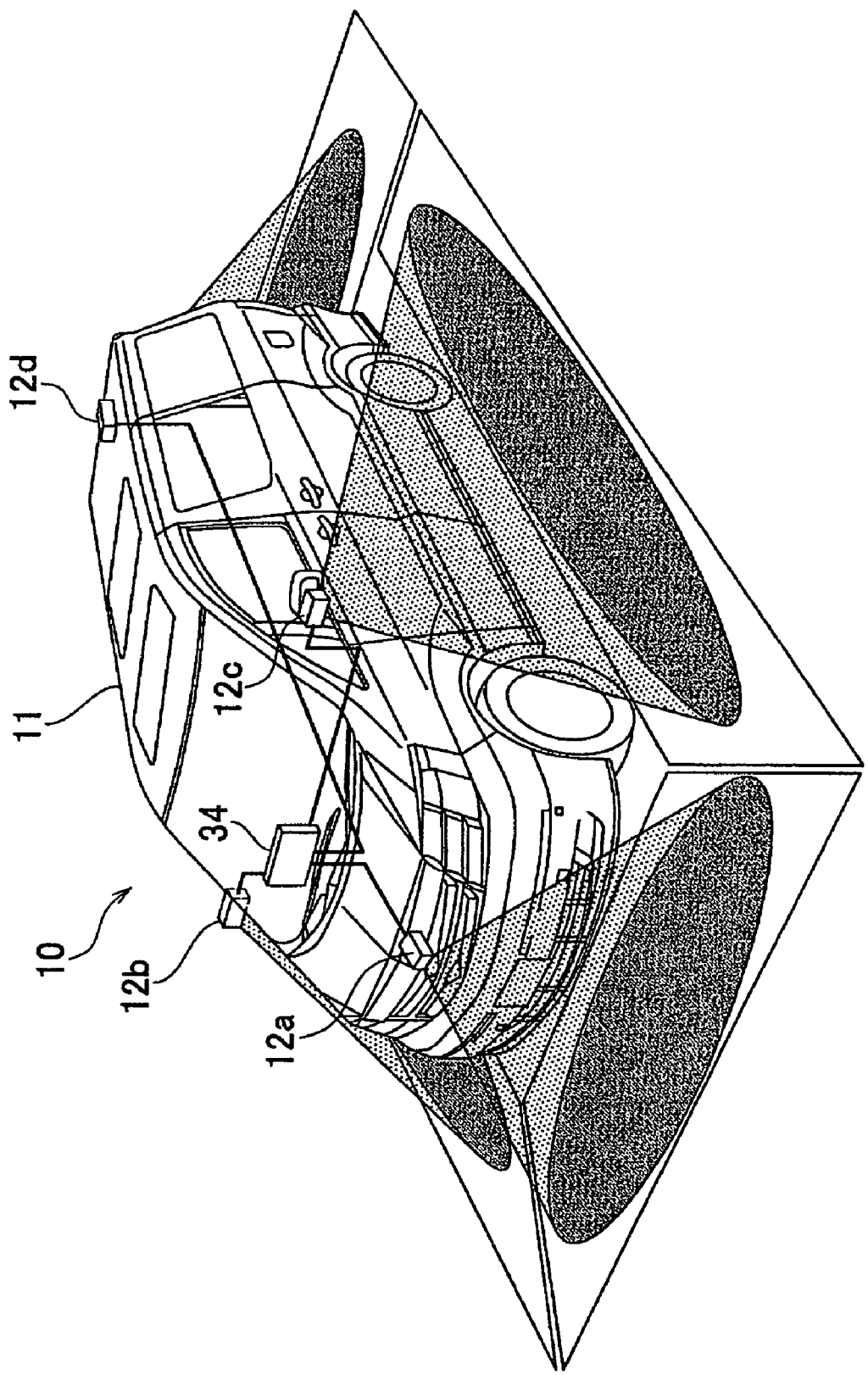
FIG. 2 is a perspective view showing the arrangement of cameras in accordance with the embodiment.

The cameras 12a to 12d are each a monocular camera using a semiconductor device such as CCD or CMOS, and equipped with a relatively wide-angle lens or a fisheye lens. FIG. 2 is a perspective view showing an example of the arrangement of the cameras in accordance with the embodiment In the example of FIG. 2, the four cameras 12a to 12d equipped with a fisheye lens are respectively installed at the front, right, left and rear of the vehicle body 11, so as to generate an image of the entire surrounding area of the vehicle body 11.

Returning to FIG. 1, the image input device 14 acquires visual images from the cameras 12a to 12d. The image input device 14 acquires frame images at predetermined intervals. The timings may be synchronous or asynchronous.

The laser radars 16a to 16d detect changes in the condition of road surfaces with respect to the cameras 12a to 12d. In order to detect an obstruction approaching, in general the laser radars 16a to 16d oscillate horizontally and vertically a laser beam they are emitting to secure a certain range of view angle. In this embodiment, the laser radars 16a to 16d acquire only the detection results obtained by emission at a certain angle. Preferably, the laser radars 16a to 16d are provided to cameras on a one by one basis. Specifically, the laser radars 16a to 16d may be a two-dimensional scanning laser radar which is commonly mounted on vehicles. In the case where the radars are installed with their laser beam rotated by 90°, they can measure a distance to a location closer to the vehicle. In this embodiment, a laser radar that can measure only one point at a short distance is used.

The radar signal input device 18 acquires laser radar measurement signals (horizontal angle, vertical angle, and distance in the direction defined by such angles) from the laser radars 16a to 16d. In fact, the radar signal input device 18 acquires laser radar measurement signals at arbitrary timings asynchronously at regular intervals.

The input synchronization device 20 is provided to adjust the timing of the input signals from the image input device 14 and the radar signal input device 18. For example, the input synchronization device 20 correlates an image IM(T) and a laser radar measurement signal (T) with time T, and an image IM(T+1) and a laser radar measurement signal (T+1) with time T+1.

The depression angle correction calculation device 22 is provided to calculate a correction angle for the depression angle, using the distance to the road surface on the assumption that the road surface is horizontal in accordance with initial setup information stored in the initial setup information storage section 24, and the distance to the road surfaces obtained by the measurement by the laser radars 16a to 16d while the vehicle is running.

The initial setup information storage section 24 stores laser radar distance measurement initial information (horizontal angle HA, vertical angle VA, and distance $L_0$ in the direction defined by such angles on the assumption that the road surface is horizontal), and the depression angle $\tau_0$, the focal length f, and the installation height H of the cameras 12a to 12d measured when the vehicle is on a horizontal surface. The initial setup information storage section 24 also stores information on correlation between the cameras 12a to 12d and the laser radars 16a to 16d, that is, information indicating that the cameras 12a to 12d are paired with the laser radars 16a to 16d, respectively.

The three-dimensional object detection device 26 is provided to detect three-dimensional objects using images obtained with the cameras 12a to 12d.

The viewpoint conversion device 28 converts images acquired by the image input device 14 into a plan view image, by planar projection, or mapping onto a cup-shaped model or the like, using a technique described in Japanese Patent Application Publications No. 10-211849 and 2003-274394 (JP-A-10-211849, JP-A-2003-274394), for example, to prepare for visual image composition. If a three-dimensional object is detected to be present at a position where the laser radars 16a to 16d are emitting a laser beam, the correction angle for the depression angle calculated by the depression angle correction calculation device 22 is reduced before a conversion into a plan view image.

Figure 3:
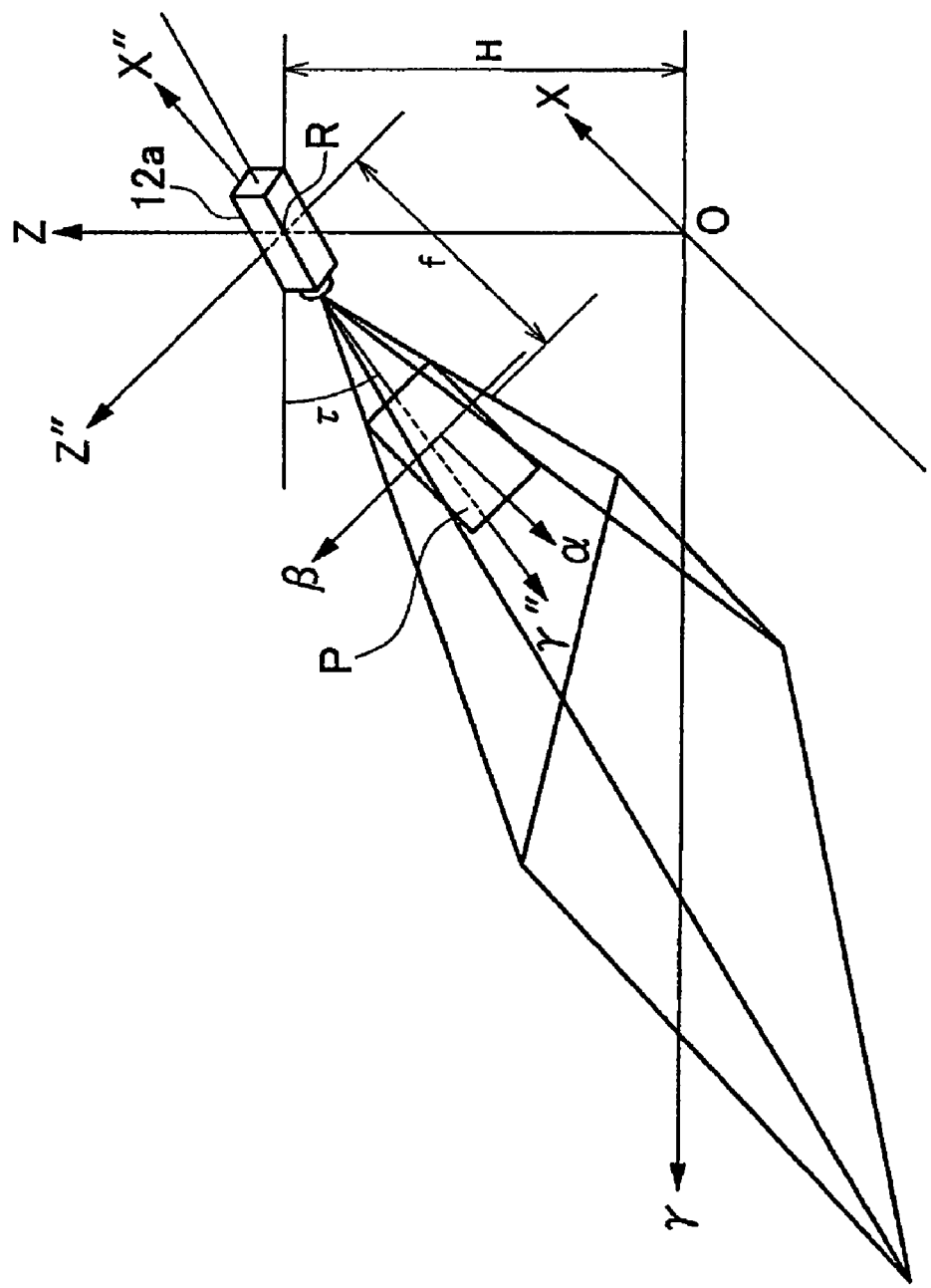
FIG. 3 is a diagram for explaining the principle of perspective transformation in accordance with the embodiment.

FIG. 3 is a diagram for explaining the principle of perspective transformation in accordance with the embodiment In the perspective transformation of FIG. 3, position data of an image of the road surface are subjected to a perspective transformation for projection to a screen plane P that is at a focal length f from a camera position R. The camera 12a is assumed to be positioned at a point R (0, 0, H) on the Z-axis, and to be monitoring the image of the road surface (xy coordinate plane) at a depression angle (overlooking angle) τ. In this case, two-dimensional coordinates (α, β) on the screen plane P (on the imaging screen) can be converted into coordinates on the road surface (coordinates on a bird's eye view image) (reverse perspective transformation), as expressed by the following equation (1):

$$\begin{bmatrix} x \\ y \end{bmatrix} = \begin{bmatrix} H \times \alpha / (-\beta \cos\tau + f\sin\tau) \\ H \times (\beta \sin\tau + f\cos\tau) / (-\beta \cos\tau + f\sin\tau) \end{bmatrix} \quad (1)$$

That is, an image before conversion I1 can be converted into an image after conversion I2 as shown in FIG. 4, using the above equation (1), to prepare projection image data (a bird's eye view image).

The visual image composition device 30 is provided to compose four images from the cameras 12a to 12d corrected by the viewpoint conversion device 28 into a single image, using a technique described in Japanese Patent Application Publications No. 2003-91720 and 2002-166802 (JP-A-2003-91720, JP-A-2002-166802), or Japanese Patent No. 3300334, for example.

The visual image output device 32 is provided to output the composed bird's eye view image after a conversion into a video signal or the like.

The display 34 presents a driver with the bird's eye view image after a brightness correction process. In general, the display 34 may be an LCD monitor or a monitor of a car navigation system.

Figure 5:
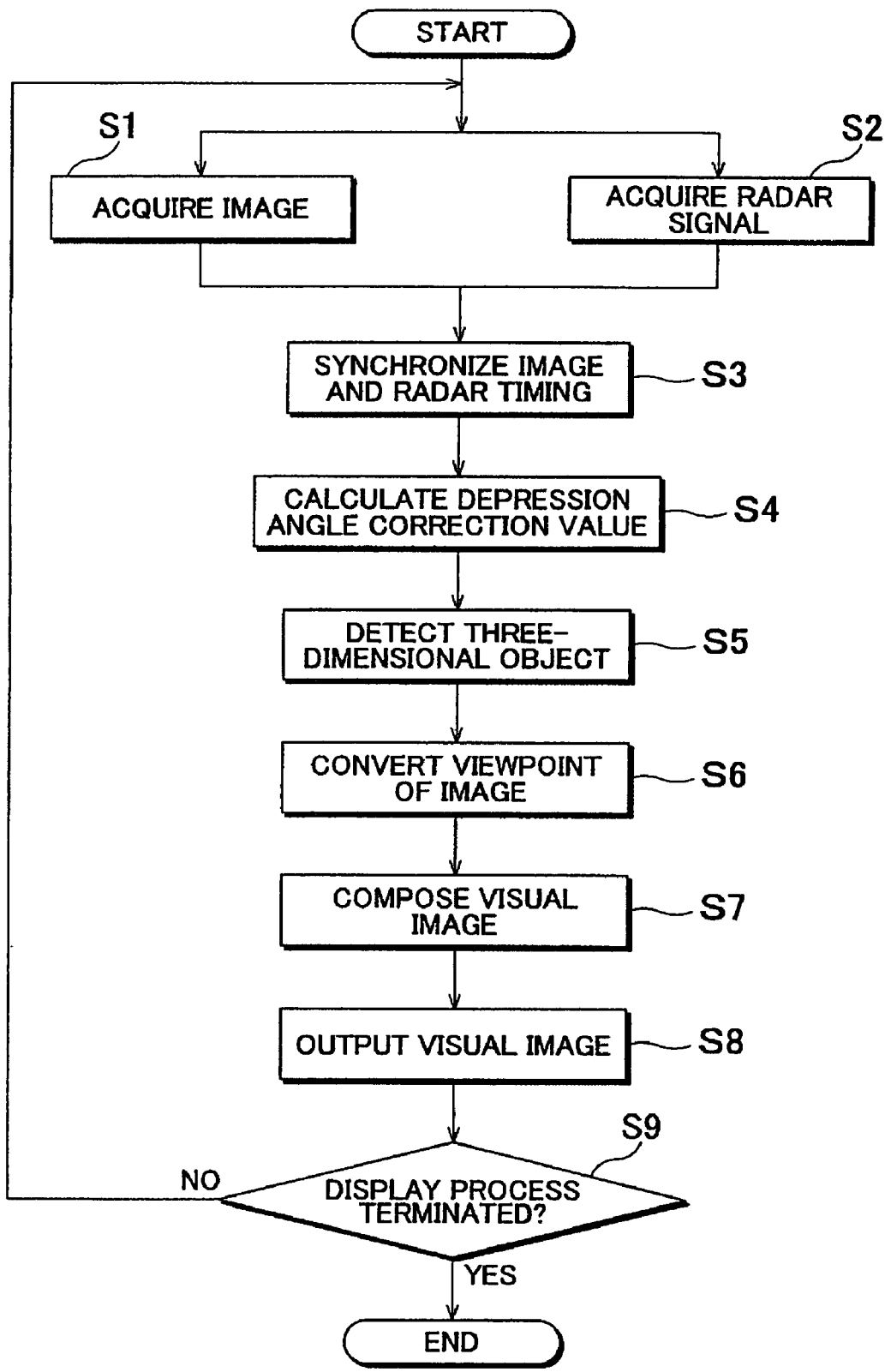
FIG. 5 is a flowchart illustrating the operation of the image display apparatus in accordance with the embodiment.

Now, the operation of the image display apparatus 10 in accordance with this embodiment will be described with reference to FIG. 5. FIG. 5 is a flowchart illustrating the operation of the image display apparatus in accordance with the embodiment. As shown in FIG. 5, in step S1, the image input device 14 takes images from the cameras 12a to 12d into the system of the image display apparatus 10. Images may be acquired at arbitrary timings. However, it is preferable that all the cameras 12a to 12d acquire images synchronously, and that images are acquired at 30 fps or more in order to acquire images in substantially real time.

In step S2, the radar signal input device 18 takes laser radar measurement signals from the laser radars 16a to 16d into the system of the image display apparatus 10. Preferably, signals are taken in at 30 Hz or more in order to acquire signals in substantially real time.

In step S3, the input synchronization device 20 generates a trigger for acquiring the images taken in step S1 and the laser radar measurement signals taken in step S2, to acquire such information. Since data are sent to the system in parallel in the processes of step S1 and step S2, triggers for information acquisition are generated asynchronously with the processes of step S1 and step S2. Data are acquired 30 times per second or more in order to acquire data in substantially real time. In data acquisition, data sent in the processes of step S1 and step S2 that are the latest are acquired. The process in step S3 described above is performed for every pair of the cameras 12a to 12d and the laser radars 16a to 16d.

In step S4, the depression angle correction calculation device 22 calculates a depression angle correction for each pair of the cameras 12a to 12d and the laser radars 16a to 16d, based on the laser radar measurement signal acquired with the trigger of step S3. The following describes a method to acquire a depression angle correction angle for the pair of the camera 12a and the laser radar 16a located at the front of the vehicle body.

Figure 6:
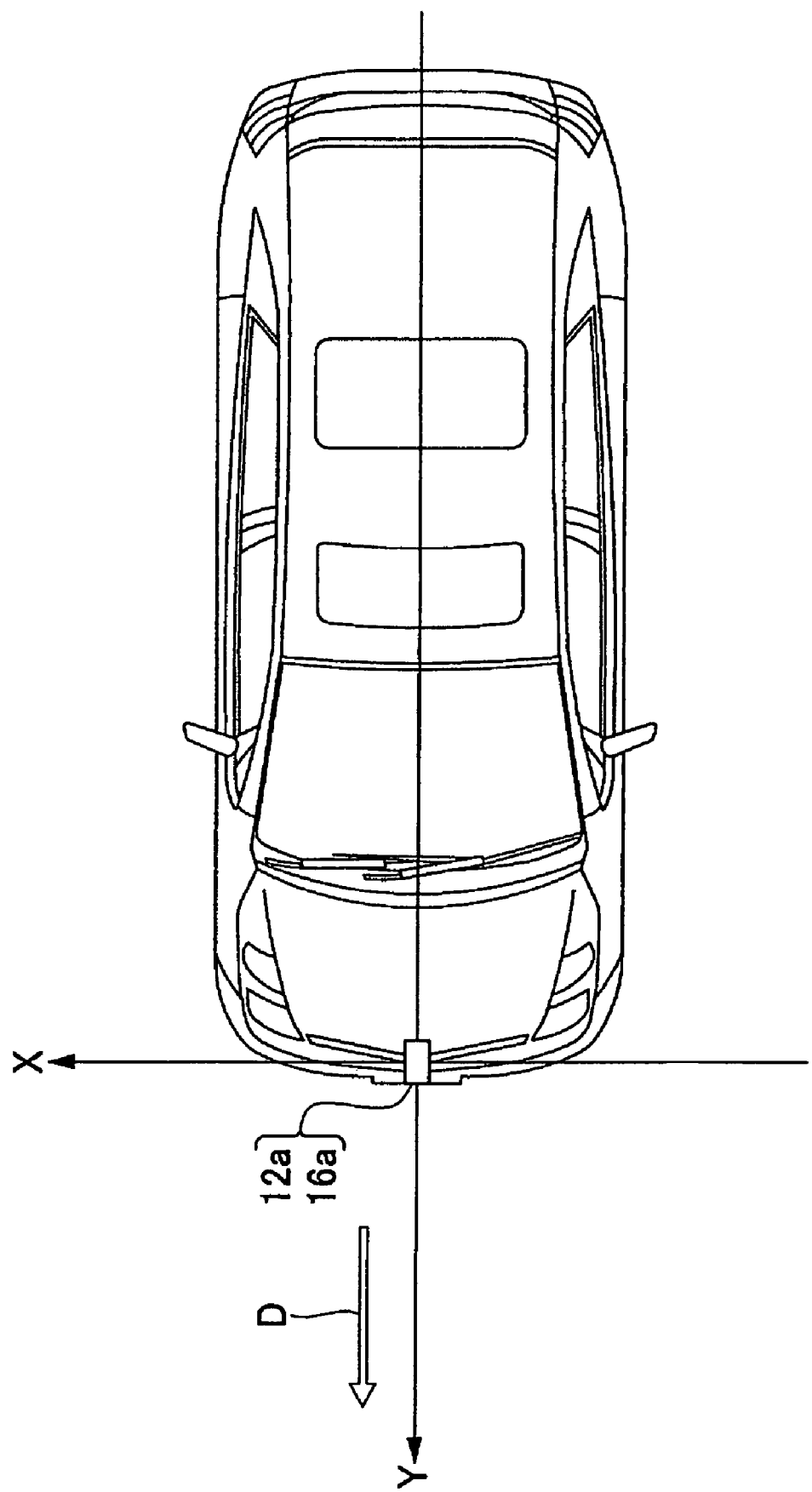
FIG. 6 is a diagram showing the coordinate system of a camera and a laser radar in accordance with the embodiment.
Figure 7:
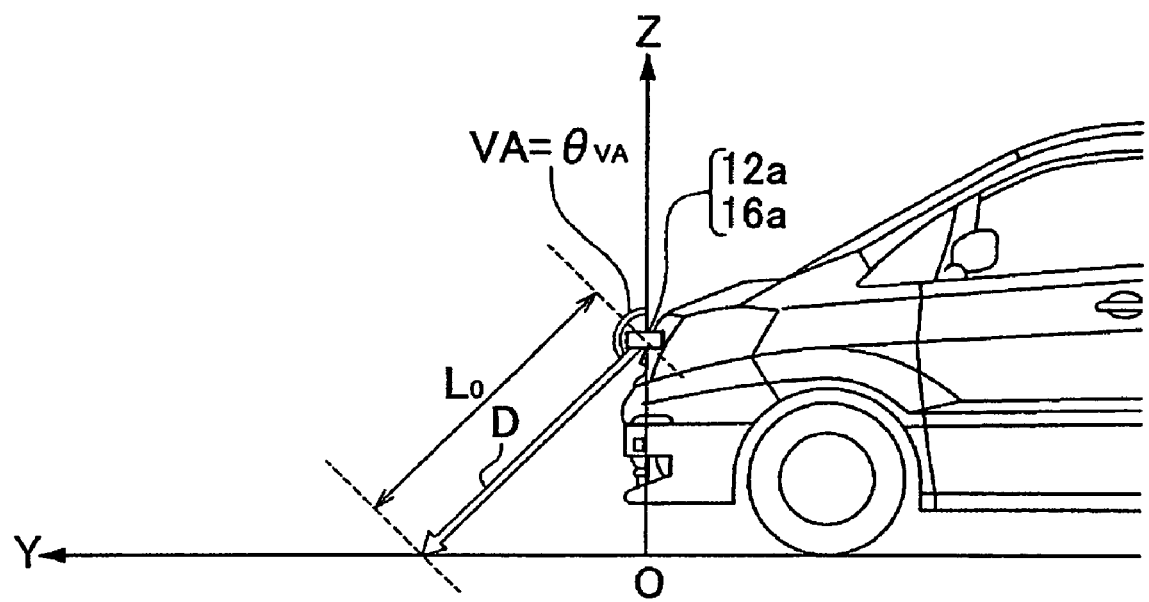
FIG. 7 is a diagram showing the coordinate system of the camera and the laser radar in accordance with the embodiment.

As illustrated in FIG. 3 discussed above, the Y-axis is defined as an axis in the road surface and in the direction of the optical axis of the camera 12a, the X-axis is defined as an axis obtained by rotating the optical axis by −90°, and the Z-axis is defined as an upward axis perpendicular to the XY plane. Applying these definitions to the camera 12a and the laser radar 16a attached at the front gives a coordinate system shown in FIGS. 6 and 7. Similar coordinate systems are given to the cameras 12b to 12d and the laser radars 16b to 16d installed at the right, left and rear of the vehicle. In the laser radar distance measurement initial information (horizontal angle HA, vertical angle VA, and distance $L_0$ in the direction defined by such angles on the assumption that the road surface is horizontal) stored in the initial setup information storage section 24, the horizontal angle HA is set as HA=$\theta_{HA}$=0°, with the Y-axis direction defined as 0° when the vehicle is seen from above, and the vertical angle VA is set as VA=$\theta_{VA}$=135°, which is at a depression angle of $\theta_{VA}$ counterclockwise with respect to the Z axis direction which is defined as 0°, as shown in FIGS. 6 and 7, respectively.

Figure 8:
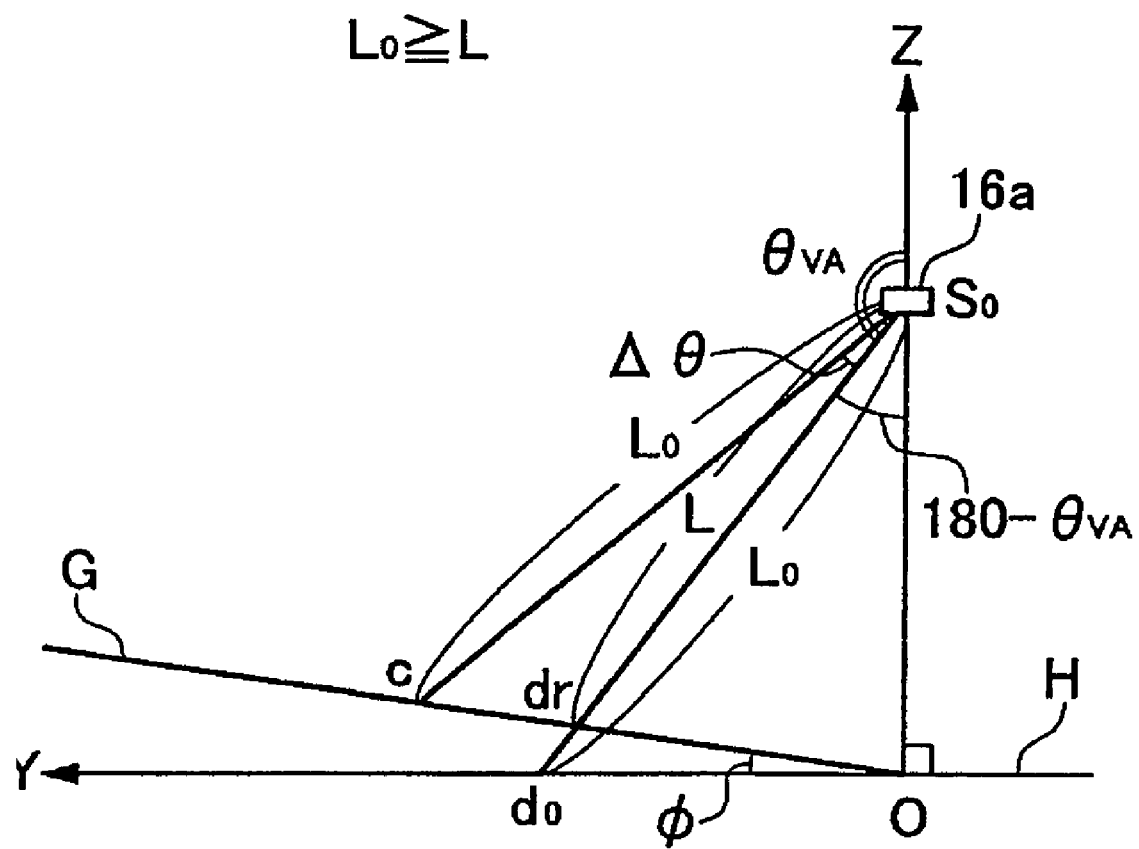
FIG. 8 is a diagram for explaining the principle of correction of a depression angle in the case of an upward slope.

FIG. 8 is a diagram for explaining the principle of correction of a depression angle in the case of an upward slope. In the case of an upward slope (when the road ascends from the position of the vehicle) as shown in FIG. 8, the installation position of the laser radar 16a stored in the initial setup information storage section 24 is defined as so. Also, the landing point of the laser beam from the laser radar 16a on a virtual horizontal plane H is defined as $d_0$. Although an actual surface G is used as the virtual horizontal plane H at the time of initial setup, a virtual horizontal plane is used instead while the vehicle is running. The distance between $s_0$ and $d_0$ is defined as $L_0$. The values of $s_0$, $d_0$ and $L_0$ are known. In addition, $\theta_{VA}$ is a preset depression angle at the installation of the laser radar 16a.

When the vehicle approaches to a slope as shown in FIG. 8, the laser radar 16a receives a laser beam reflected at a point dr, not at the point $d_0$, and a distance L between $s_0$ and dr is detected as the distance to be measured. The depression angle is adjusted according to an inclination Φ of the actual surface G, such that L is always equal to $L_0$. A correction angle for the depression angle Δθ is the angle that makes the distance between $s_0$ and c equal to $L_0$. The correction angle for the depression angle is expressed by a function of L such as the following equation (2):

$$\Delta\theta = \theta_{VA} - \arctan\left[\frac{L\tan\theta_{VA}}{(L_0 - L) - \sqrt{(L_0 - L)^2 \cos^2\theta_{VA} + L^2 \sin^2\theta_{VA}}}\right] \quad (2)$$

Figure 9:
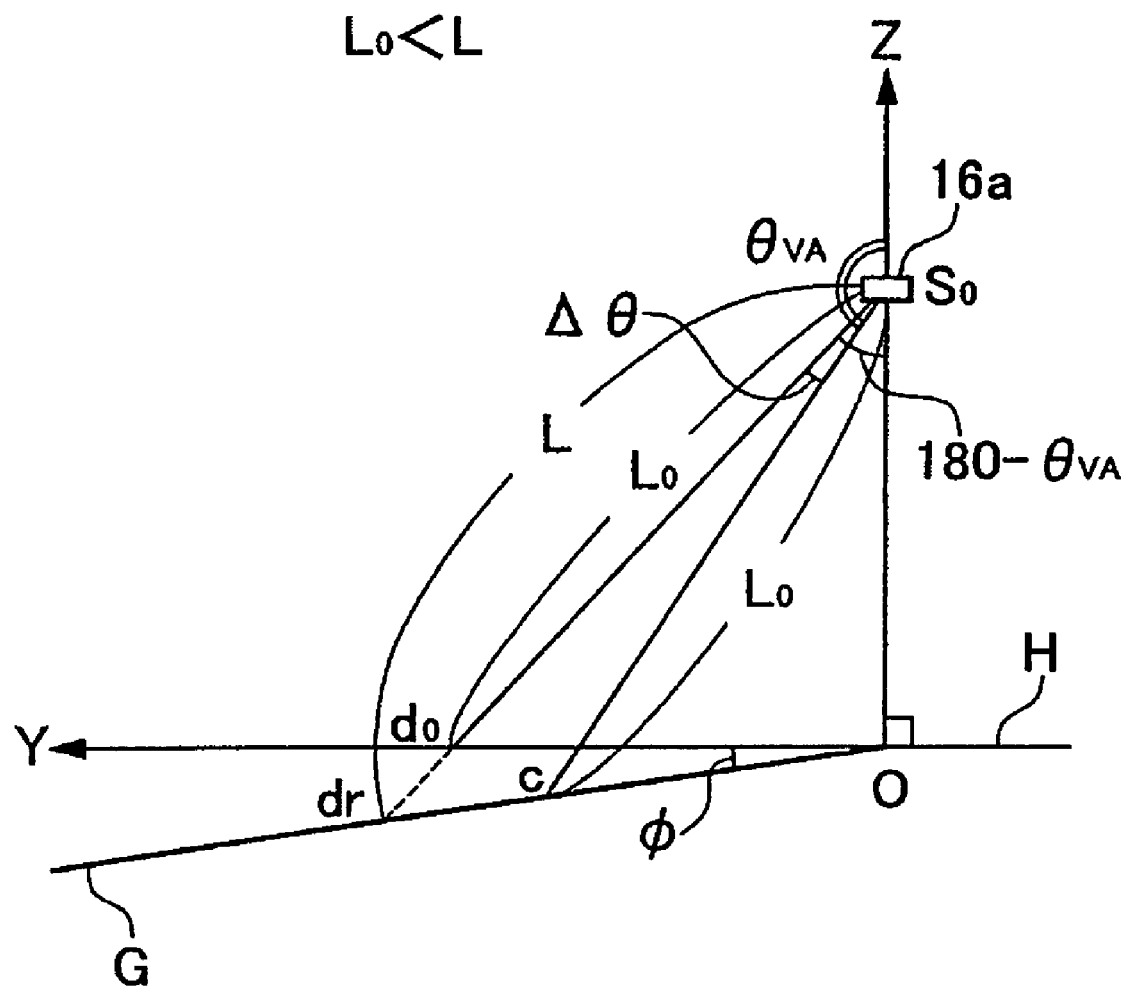
FIG. 9 is a diagram for explaining the principle of correction of a depression angle in the case of a downward slope.
Figure 10:
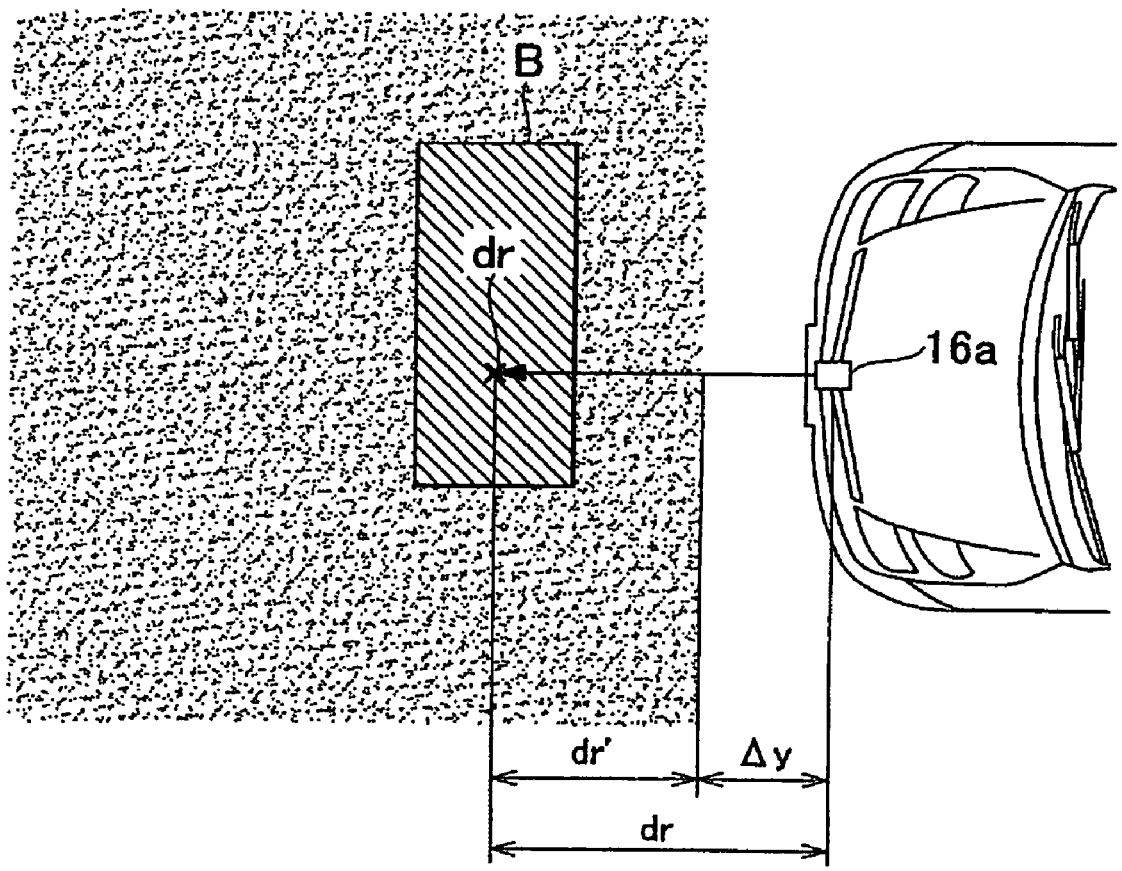
FIG. 10 is a diagram showing how a three-dimensional object and the landing point of a laser beam overlap.

FIG. 9 is a diagram for explaining the principle of correction of a depression angle in the case of a downward slope. In the case of a downward slope (when the road descends from the position of the vehicle) as shown in FIG. 9, a correction angle for the depression angle Δθ is calculated based on the positional relation in the drawing, in a similar way to the case of an upward slope. In this case, the distance L between the installation position $s_0$ of the laser radar 16a and a point dr detected by the laser radar 16a is detected as it is longer than $L_0$ (the distance between $s_0$ and $d_0$) stored in the initial setup information storage section 24. Then, a position c on the actual surface G where the distance L is equal to $L_0$ is calculated to obtain a correction angle for the depression angle Δθ, as in the case of an upward slope discussed above. The correction angle for the depression angle is expressed by a function of L such as the following equation (3):

$$\Delta\theta = \arctan\left[\frac{L\tan\theta_{VA}}{(L-L_0) - \sqrt{(L-L_0)^2\cos^2\theta_{VA} + L^2\sin^2\theta_{VA}}}\right] - \theta_{VA} \quad (3)$$

In step S5, the three-dimensional object detection device 26 detects a three-dimensional object using the image IM(T) generated at the time T and the image IM(T+1) generated at the time T+1 acquired with each of the cameras 12b to 12d in step S1. A three-dimensional object can be detected using a technique described in Japanese Patent Application Publication No. 2001-187553 (JP-A-2001-187553), for example. Specifically, at least two points are extracted from each of the image IM(T) generated at the time T and the image IM(T+1) generated at the time T+1, and a triangulation is performed to calculate the distance between the vehicle and the three-dimensional object Then, edges of the three-dimensional object are detected from the image IM(T) and the image IM(T+1), and coordinate data of identical edges captured in the image IM(T) and the image IM(T+1) and travel data of the vehicle are used to calculate the distance from the vehicle to the edges of the three-dimensional object. By performing this process, the area of a three-dimensional object present in the image IM(T+1) may be determined.

In step S6, the viewpoint conversion device 28 converts the viewpoint of the captured images using the information acquired in step S4 and step S5, before a projection to the virtual horizontal plane. It is checked whether or not the laser beam landing point dr in step S4 falls in the area of the three-dimensional object detected in step S5.

The distance dr between the point dr and the origin O in the coordinate system of the laser radar 16a (hereinafter referred to as "laser radar coordinate system") is obtained by the equation: dr=L sin $\theta_{va}$. In this case, it is necessary to obtain the positional relation of the laser radar coordinate system with a coordinate system with its origin at the installation position of the camera 12a (hereinafter referred to as "image coordinate system"). In order to obtain the positional relation between the laser radar coordinate system and the image coordinate system, it is necessary to transform the image coordinate system into the laser radar coordinate system using parameters of the camera 12a that was used in the three-dimensional object recognition. That is, it is necessary to perform a coordinate conversion (viewpoint conversion) on the coordinates of a three-dimensional object detection area B with the camera 12a at a depression angle $\theta_{va}$. Because the installation position of the camera 12a is not necessarily the same as the installation position of the laser radar 16a, it is necessary to consider an amount of deviation in the Y-axis direction $\Delta y$ between the image coordinate system and the laser radar coordinate system That is, defining the laser beam landing point as dr'=dr−$\Delta y$, a three-dimensional object is determined to be "present" if the laser beam landing point dr' falls in the area of the three dimensional object after the coordinate conversion, and a three-dimensional object is determined to be "not present" otherwise.

If a three-dimensional object is determined to be "present," the correction angle for the depression angle $\Delta\theta$ calculated in step S4 is modified to reduce its effect on the viewpoint conversion. In this embodiment, the correction angle for the depression angle is modified so as to satisfy $\Delta\theta=0$.

If a three-dimensional object is determined to be "not present," and $L_0 \geq L$, the correction angle for the depression angle $\Delta\theta$ is substituted into the equation (4) below, as can be understood from FIG. 8, to obtain a depression angle for actual use in correction.

Depression Angle after Modification $$\tau = \tau_0 - \Delta\theta \; (\tau_0 = \theta_{VA}) \quad (4)$$

If a three-dimensional object is determined to be "not present," and $L_0 < L$, the correction angle for the depression angle $\Delta\theta$ is substituted into the equation (5) below, as can be understood from FIG. 9, to obtain a depression angle for actual use in correction.

Depression Angle after Modification $$\tau = \tau_0 + \Delta\theta \; (\tau_0 = \theta_{VA}) \quad (5)$$

After the depression angle after modification $\tau$ is obtained as described above, a viewpoint conversion is performed by the above equation (1). The above processes are performed on every pair of the cameras 12a to 12d and the laser radars 16a to 16d.

In step S7, the visual image composition device 30 composes four images from the cameras 12a to 12d subjected to the viewpoint conversion in step S6, using a technique in accordance with the related art. Overlapping areas between the front, rear, right and left images are composed using α blending, for example. In this embodiment, the front and rear images are composed with an α value of 100%, and the left and right images are composed with an α value of 0%.

In step S8, the visual image output device 32 outputs the composed image generated in step S7 to the display 34, after a conversion into a video signal or the like.

In step S9, the operation of the image display apparatus 10 is ended, for example by stopping an engine of the vehicle.

According to this embodiment, the laser radars 16a to 16d detect a change in condition of road surfaces with respect to the cameras 12a to 12d, the depression angle correction calculation device 22 adds a correction angle to a depression angle of the cameras 12a to 12d, and the perspective conversion device 28 reduces the correction angle of the depression angle correction calculation device 22 if the change in condition of the road surfaces detected by the laser radars 16a to 16d is due to a three-dimensional object detected by the three-dimensional object detection device 26. Thus, it is possible to display a bird's eye view image that is corrected according to changes in road surface conditions and that is not affected by a three-dimensional object on the road surface. Therefore, it is possible to display a bird's eye view image that is not affected by an object on the road surface such as curbs and car stoppers, if any, and that is not at all uncomfortable to the driver.

According to this embodiment, in particular, the laser radars 16a to 16d measure the distance between the cameras 12a to 12d and the road surfaces, and the viewpoint conversion device 28 reduces the correction angle of the depression angle correction angle calculation device 22 if the distance between the cameras 12a to 12d and the road surfaces detected by the laser radars 16a to 16d is determined to be the distance between a three-dimensional object detected by the three-dimensional object detection device 26 and the cameras 12a to 12d. Thus, it is less likely that an erroneous correction is performed due to interference from a three-dimensional object.

In addition, the laser radars 16a to 16d can accurately measure the distance between the cameras 12a to 12d and the road surfaces by emitting a laser beam to the road surfaces.

An embodiment of the present invention has been described above. The present invention is not limited to the above embodiment, and may be modified in various ways.

What is claimed is:

1. An image display apparatus that converts a viewpoint of an original image of a driving environment obtained with an imaging device based on a depression angle of the imaging device to display a bird's eye view image, the image display apparatus comprising:
   a road surface condition detection device that detects a distance between the imaging device and a road surface;
   a depression angle correction calculation device that adds a correction angle to the depression angle of the imaging device so as to make the distance between the imaging device and the road surface constant in response to a change in distance between the imaging device and the road surface detected by the road surface condition detection device;
   a depression angle correction modification device that reduces the correction angle; and
   a three-dimensional object detection device that detects a three-dimensional object present on the road surface,
   wherein the depression angle correction modification device reduces the correction angle if it is determined that the distance between the imaging device and the road surface detected by the road surface condition detection device is equal to a distance between the three-dimensional object detected by the three-dimensional object detection device and the imaging device.

2. The image display apparatus according to claim 1, wherein
   the depression angle correction modification device sets the correction angle to 0 if the distance between the imaging device and the road surface detected by the road surface condition detection device is equal to the distance between the three-dimensional object detected by the three-dimensional object detection device and the imaging device.

3. The image display apparatus according to claim 1, wherein the distance between the imaging device and the road surface is calculated based on a plurality of the original images obtained with the imaging device.

4. The image display apparatus according to claim 1, wherein the road surface condition detection device includes a laser radar that measures the distance between the imaging device and the road surface.

5. The image display apparatus according to claim 4, wherein the laser radar emits to secure a predetermined view angle.

6. An image display method for converting a viewpoint of an original image of a driving environment obtained with an imaging device based on a depression angle of the imaging device to display a bird's eye view image, comprising:
   detecting a distance between the imaging device and a road surface;
   detecting a three-dimensional object present on the road surface;
   adding a correction angle to the depression angle of the imaging device so as to make the distance between the imaging device and the road surface constant in response to a detected change in distance between the imaging device and the road surface; and
   reducing the correction angle if the detected distance between the imaging device and the road surface is equal to a distance between the detected three-dimensional object and the imaging device.

7. The image display method according to claim 6, wherein
   the correction angle is set to 0 if the detected distance between the imaging device and the road surface is determined to be equal to the distance between the detected three-dimensional object and the imaging device.

8. The image display method according to claim 7, wherein the distance between the imaging device and the road surface is determined based upon a plurality of the original images acquired by the imaging device.

9. The image display method according to claim 7, wherein the distance between the imaging device and the road surface is measured with a laser radar.

10. The image display method according to claim 9, wherein the laser radar emits to secure a predetermined view angle.

11. An image display apparatus that converts a viewpoint of an original image of a driving environment obtained with an imaging device based on a depression angle of the imaging device to display a bird's eye view image, the image display apparatus comprising:
    a road surface condition detection device that detects an angle between the imaging device and a road surface;
    a depression angle correction calculation device that adds a correction angle to the depression angle of the imaging device so as to make the angle between the imaging device and the road surface constant in response to a change in the angle between the imaging device and the road surface detected by the road surface condition detection device;
    a depression angle correction modification device that reduces the correction angle; and
    a three-dimensional object detection device that detects a three-dimensional object present on the road surface,
    wherein the depression angle correction modification device reduces the correction angle if it is determined that the angle between the imaging device and the road surface detected by the road surface condition detection device is equal to an angle between the three-dimensional object detected by the three-dimensional object detection device and the imaging device.

12. The image display apparatus according to claim 11, wherein the road surface condition detection device includes a laser radar that measures the angle between the imaging device and the road surface.

13. The image display apparatus according to claim 11, wherein the depression angle correction modification device sets the correction angle to 0 if the angle between the imaging device and the road surface detected by the road surface condition detection device is equal to the angle between the three-dimensional object detected by the thee-dimensional object detection device and the imaging device.

14. An image display apparatus that converts a viewpoint of an original image of a surrounding environment of a vehicle obtained with imaging means based on a depression angle of the imaging means to display a birdts eye view image, the image display apparatus comprising:
    road surface condition detection means for detecting a distance between the imaging means and a road surface;
    depression angle correction calculation means for adding a correction angle to the depression angle of the imaging means so as to make the distance between the imaging means and the road surface constant in response to a change in the distance between the imaging means and the road surface detected by the road surface condition detection means;

depression angle correction modification means for reducing the correction angle of the depression angle correction calculation means; and three-dimensional object detection means for detecting a three-dimensional object present on the road surface, wherein the depression angle correction modification means reduces the correction angle of the depression angle correction calculation means if it is determined that the distance between the imaging means and the road surface detected by the road surface condition detection means is equal to a distance between the three-dimensional object detected by the three-dimensional object detection means and the imaging means.

15. The image display apparatus according to claim 14, wherein the road surface condition detection means includes a laser radar that measures the distance between the imaging means and the road surface.

16. The image display apparatus according to claim 14, wherein the depression angle correction modification means sets the correction angle of the depression angle correction calculation means to 0 if the distance between the imaging means and the road surface detected by the road surface condition detection means is equal to the distance between the three-dimensional object detected by the thee-dimensional object detection means and the imaging means.

17. An image display apparatus that converts a viewpoint of an original image of a surrounding environment of a vehicle obtained with imaging means based on a depression angle of the imaging means to display a bird's eye view image, the image display apparatus comprising:

road surface condition detection means for detecting an angle between the imaging means and a road surface;

depression angle correction calculation means for adding a correction angle to the depression angle of the imaging means so as to make the angle between the imaging means and the road surface constant in response to a change in the angle between the imaging means and the road surface detected by the road surface condition detection means;

depression angle correction modification means for reducing the correction angle of the depression angle correction calculation means; and three-dimensional object detection means for detecting a three-dimensional object present on the road surface, wherein the depression angle correction modification means reduces the correction angle of the depression angle correction calculation means if it is determined that the angle between the imaging means and the road surface detected by the road surface condition detection means is equal to an angle between the three-dimensional object detected by the three-dimensional object detection means and the imaging means.

18. The image display apparatus according to claim 17, wherein the road surface condition detection means includes a laser radar that measures the angle between the imaging means and the road surface.

19. The image display apparatus according to claim 17, wherein the depression angle correction modification means sets the correction angle of the depression angle correction calculation means to 0 if the angle between the imaging means and the road surface detected by the road surface condition detection means is equal to the angle between the three-dimensional object detected by the three-dimensional object detection means and the imaging means.

* * * * *